United States Patent
Wakunami et al.

(10) Patent No.: US 12,498,513 B2
(45) Date of Patent: Dec. 16, 2025

(54) AR OPTICAL ELEMENT, METHOD FOR MANUFACTURING THE SAME, AND AR DISPLAY DEVICE

(71) Applicant: National Institute of Information and Communications Technology, Tokyo (JP)

(72) Inventors: Koki Wakunami, Tokyo (JP); Yasuyuki Ichihashi, Tokyo (JP); Shunsuke Yoshida, Tokyo (JP)

(73) Assignee: National Institute of Information and Communications Technology, Tokyo (JP)

( * ) Notice: Subject to any disclaimer, the term of this patent is extended or adjusted under 35 U.S.C. 154(b) by 385 days.

(21) Appl. No.: 18/245,477

(22) PCT Filed: Sep. 16, 2021

(86) PCT No.: PCT/JP2021/034066
§ 371 (c)(1),
(2) Date: Mar. 15, 2023

(87) PCT Pub. No.: WO2022/065185
PCT Pub. Date: Mar. 31, 2022

(65) Prior Publication Data
US 2023/0333300 A1     Oct. 19, 2023

(30) Foreign Application Priority Data

Sep. 23, 2020   (JP) ................. 2020-158276

(51) Int. Cl.
*G02B 5/32*   (2006.01)
*G02B 30/60*  (2020.01)
*G03H 1/04*   (2006.01)

(52) U.S. Cl.
CPC ............... *G02B 5/32* (2013.01); *G02B 30/60* (2020.01); *G03H 1/0476* (2013.01)

(58) Field of Classification Search
CPC .. G02B 5/32; G02B 30/60; G02B 2027/0118; G02B 2027/0174; G02B 27/0172;
(Continued)

(56) References Cited

U.S. PATENT DOCUMENTS

| 5,016,953 A | 5/1991 | Moss et al. |
| 5,886,675 A | 3/1999 | Aye et al. |

(Continued)

FOREIGN PATENT DOCUMENTS

| CN | 104777535 A | 7/2015 | |
| EP | 1457974 A1 * | 9/2004 | .......... B01F 23/2312 |

(Continued)

OTHER PUBLICATIONS

Extended European Search Report pertaining to European Patent Application No. 21872315.3, mailed Sep. 11, 2024.

(Continued)

*Primary Examiner* — Collin X Beatty
(74) *Attorney, Agent, or Firm* — GRUMBLES LAW PLLC; Brittany Haanan

(57) ABSTRACT

An AR optical element having high image quality, high efficiency of light utilization, and small-size is provided. The AR optical element has periodic structures of refractive index multiplexed with a predetermined interval and predetermined multiplicity, wherein each of the periodic structures of refractive index has an optical normal in a different direction from a physical normal orthogonal to a plane of a micro-region that reflects incident light.

3 Claims, 9 Drawing Sheets

(58) Field of Classification Search
CPC .... G03H 1/0476; G03H 1/265; G03H 1/0808; G03H 2001/0439
See application file for complete search history.

(56) References Cited

U.S. PATENT DOCUMENTS

| | | | |
|---|---|---|---|
| 10,976,550 B2* | 4/2021 | Ayres | G02B 6/0038 |
| 2003/0107785 A1 | 6/2003 | Takeyama et al. | |
| 2006/0291021 A1 | 12/2006 | Mukawa | |
| 2009/0303212 A1 | 12/2009 | Akutsu et al. | |
| 2020/0103651 A1 | 4/2020 | Ando et al. | |

FOREIGN PATENT DOCUMENTS

| | | | |
|---|---|---|---|
| JP | 2001051123 A | 2/2001 | |
| JP | 2002116442 A | 4/2002 | |
| JP | 2002258215 A | 9/2002 | |
| WO | 2019243554 A1 | 12/2019 | |

OTHER PUBLICATIONS

International Search Report and Written Opinion pertaining to PCT/JP2021/034066, mailed Nov. 16, 2021.
Tokita, Masatoshi, "Developing Transparent Film for Screens", Japan Science and Technology Agency (JST), https://www.jst.go.jp/EN/achievements/research/masatoshi_tokita2017.html, access Feb. 20, 2023.

* cited by examiner

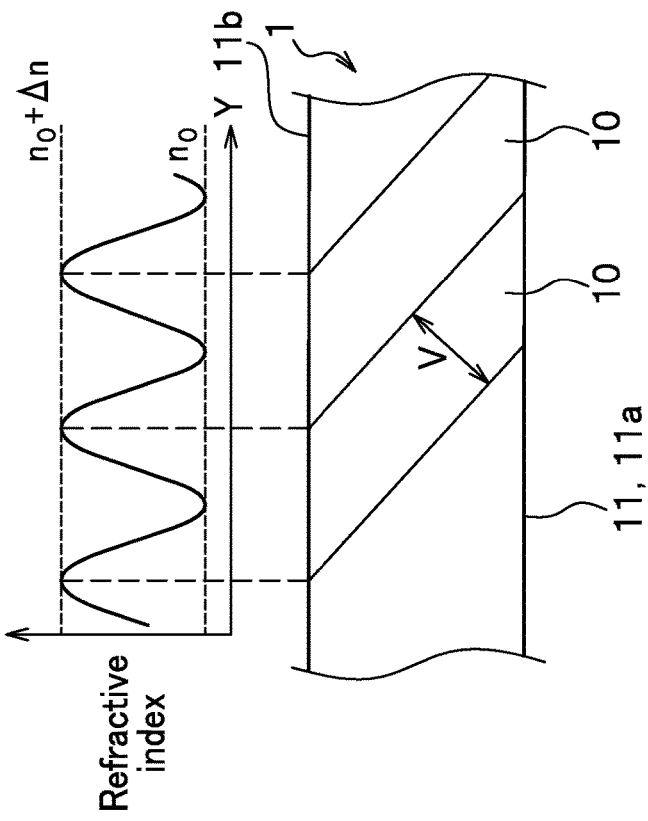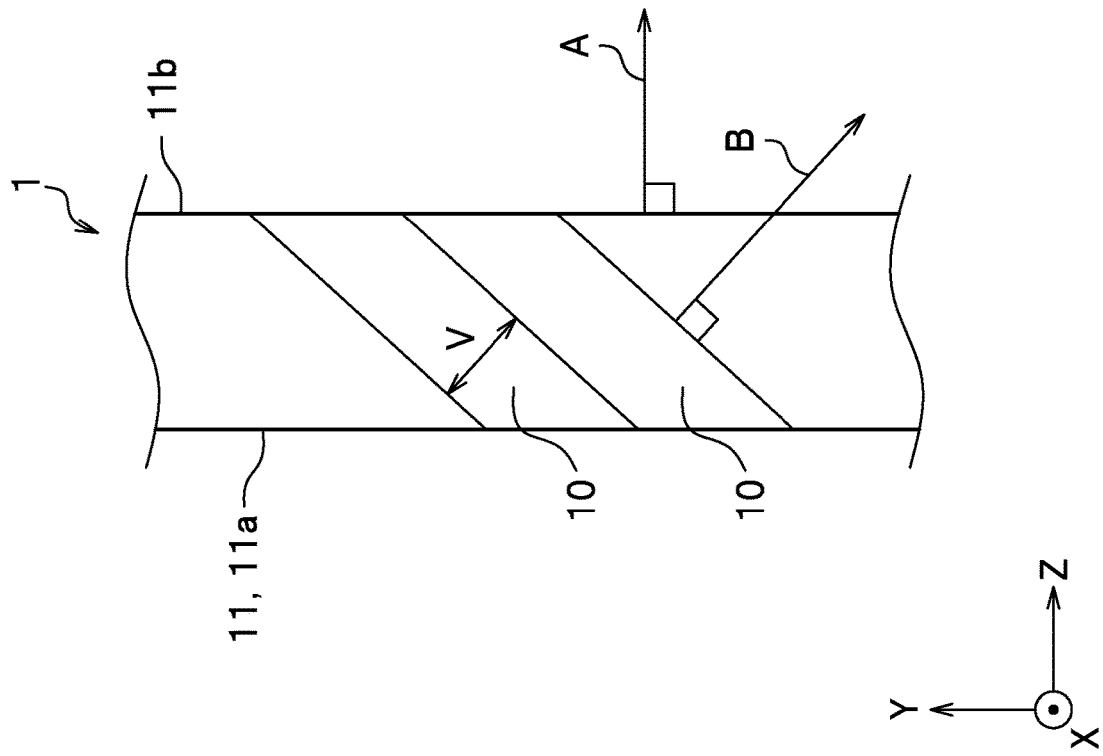

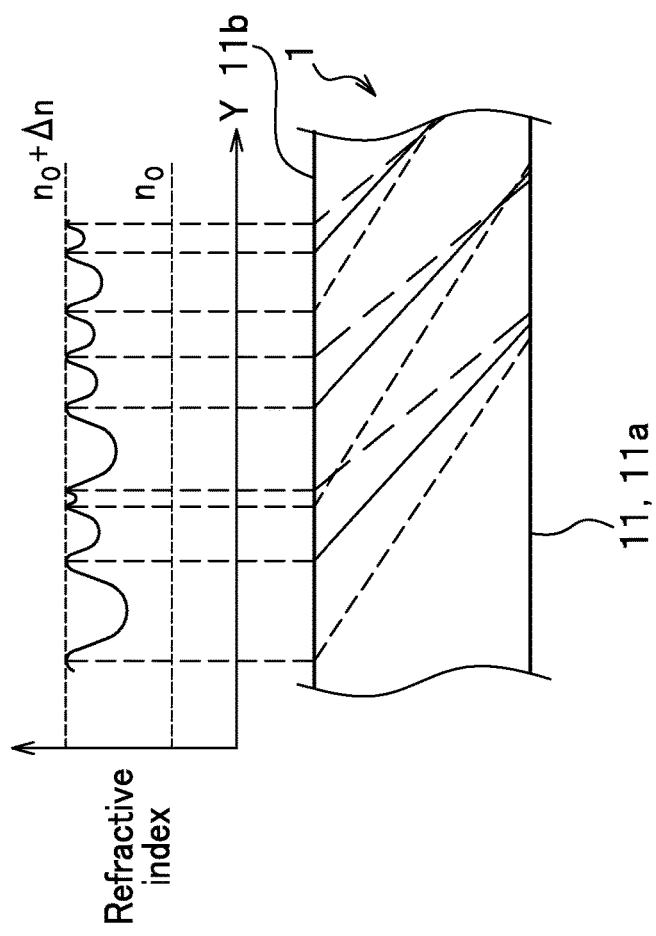
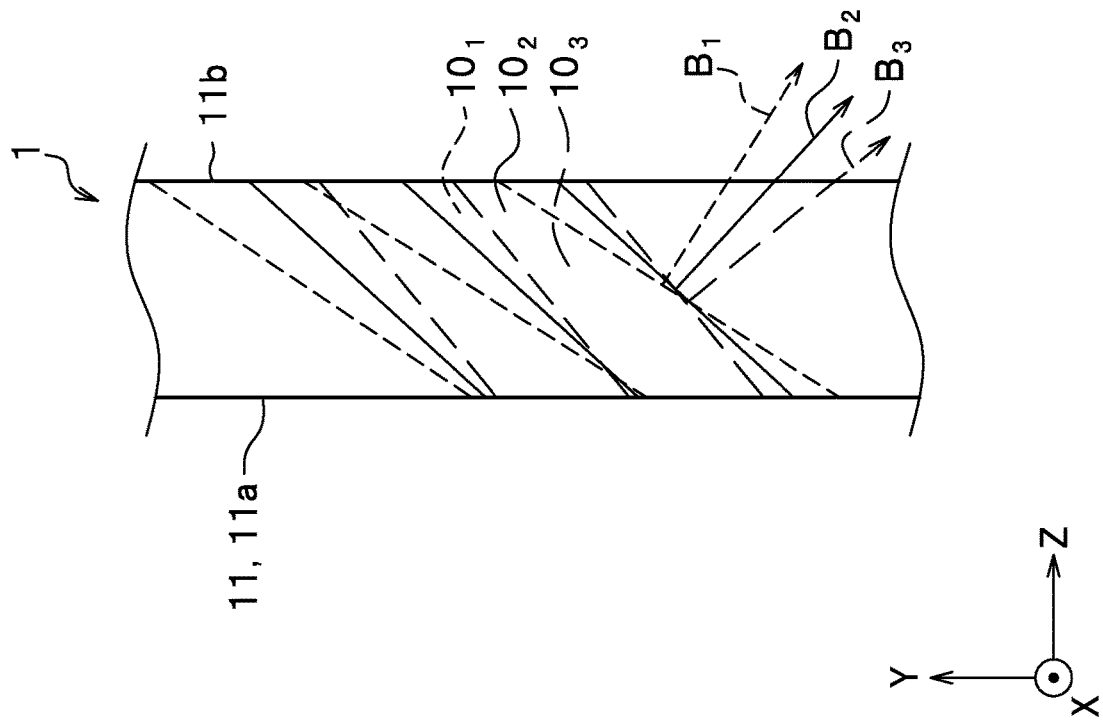

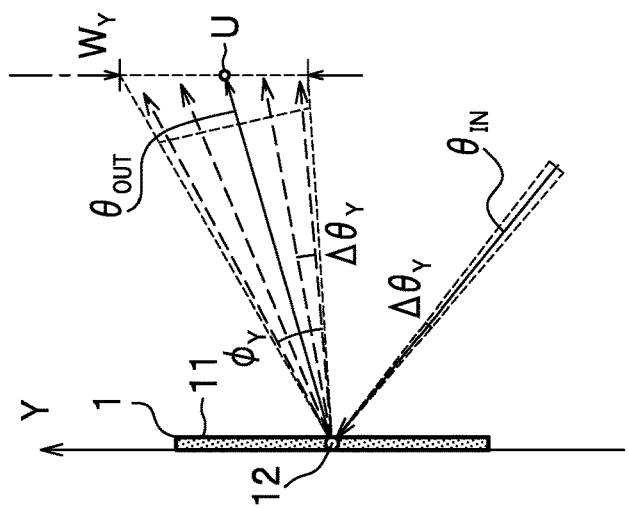
FIG. 3C
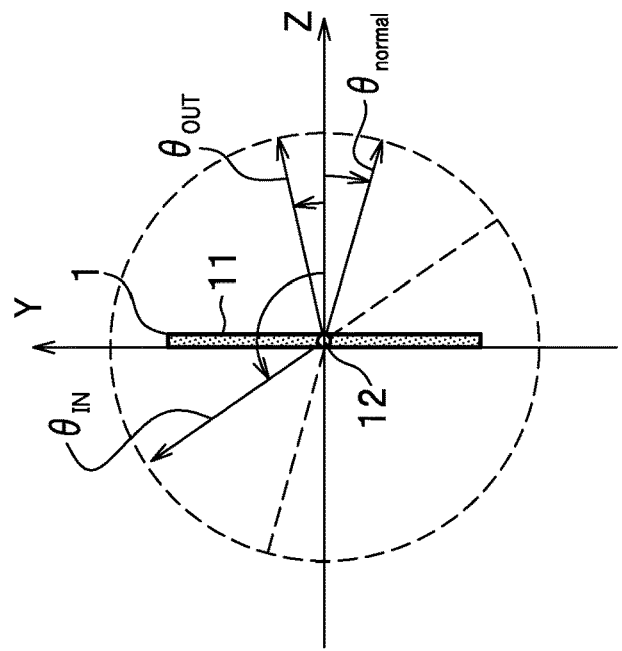
FIG. 3B
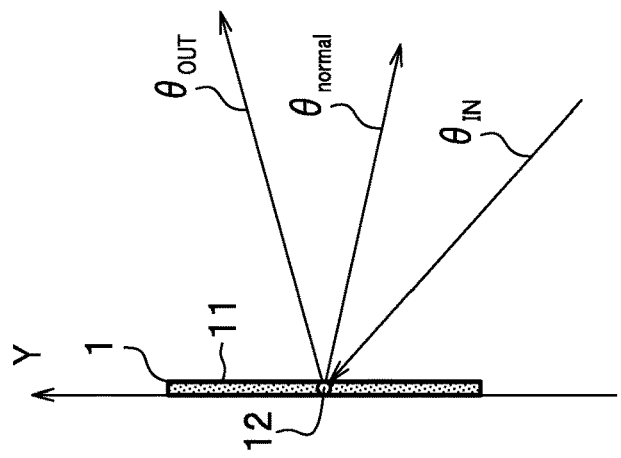
FIG. 3A
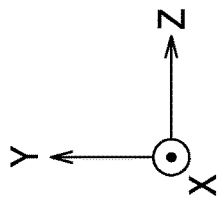

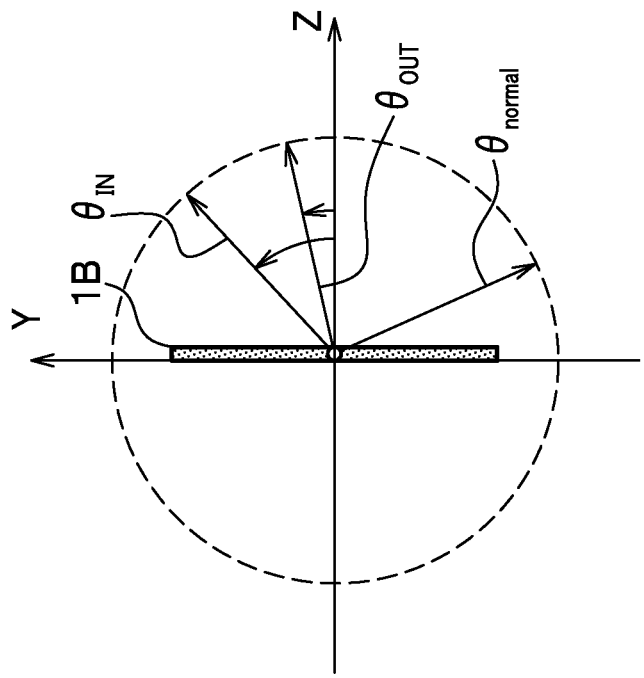
FIG. 5B
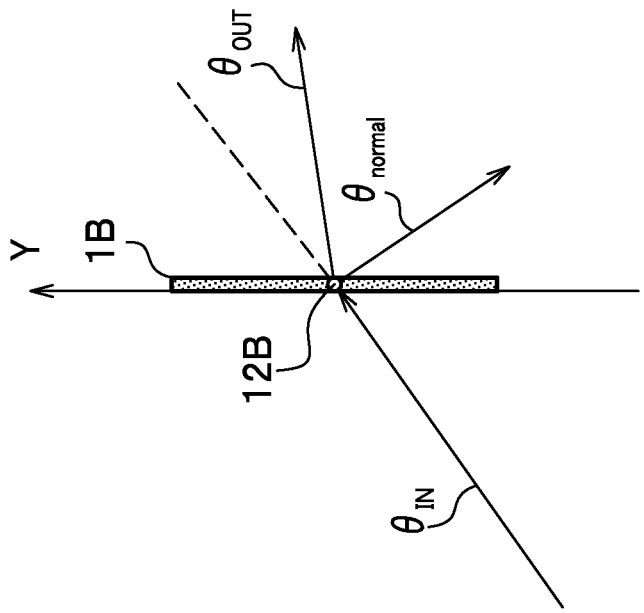
FIG. 5A
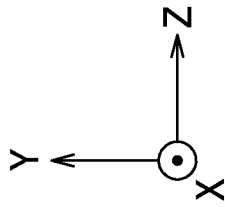

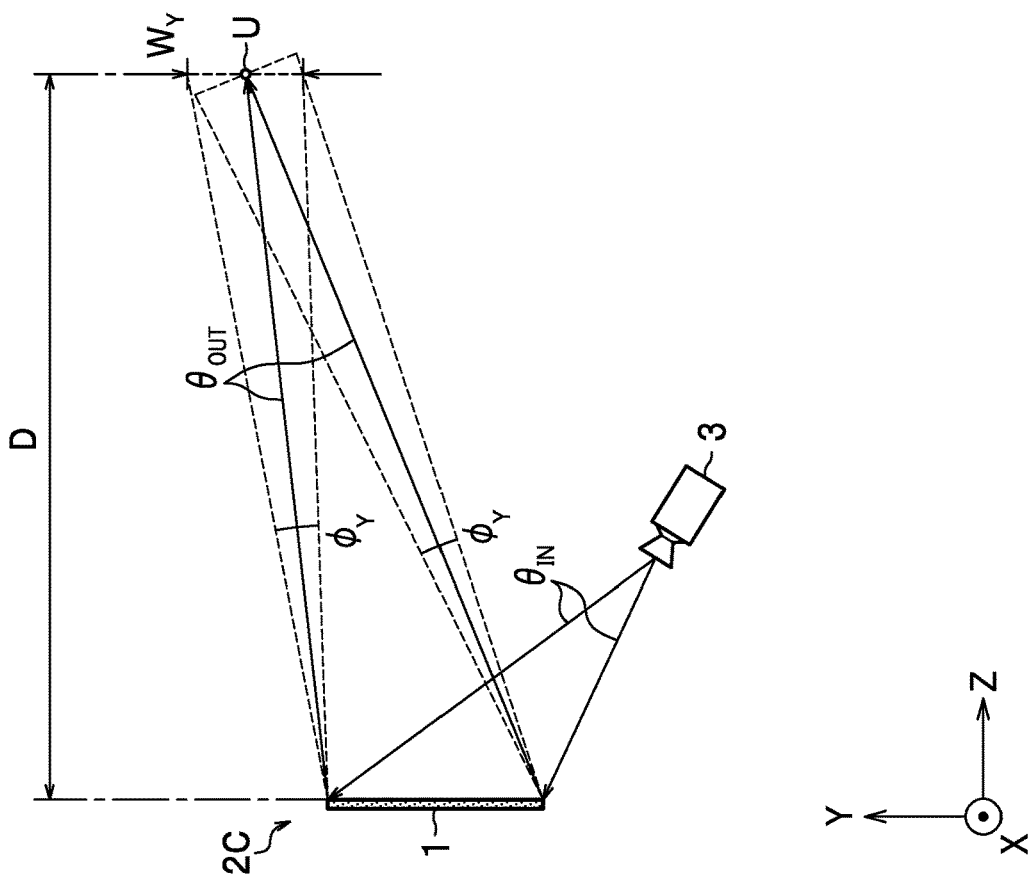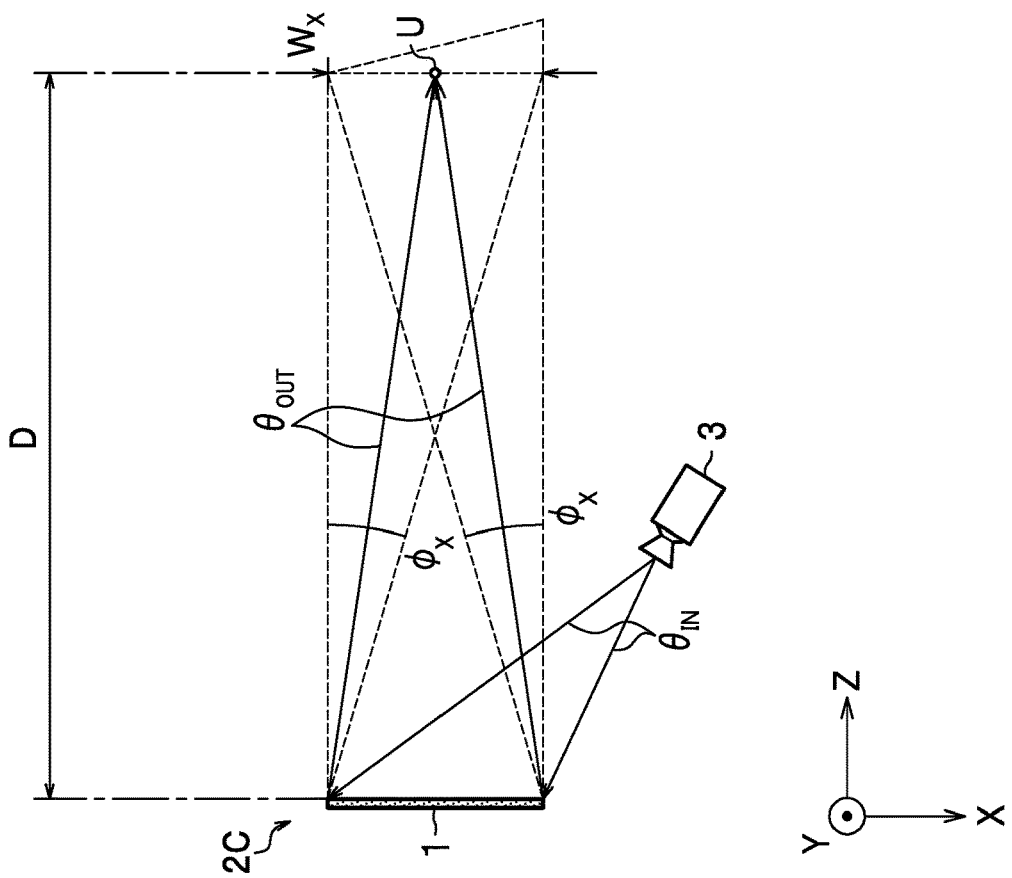

AR OPTICAL ELEMENT, METHOD FOR MANUFACTURING THE SAME, AND AR DISPLAY DEVICE

TECHNICAL FIELD

This invention relates to an AR (Augmented Reality) optical element, a manufacturing method thereof, and an AR display device employing the AR optical element.

BACKGROUND ART

AR is beginning to be utilized in various fields, and AR devices such as smart glasses, a head-up display, and a head-mounted display are becoming increasingly diversified. An AR device using a projection device and a diffusion screen has been conventionally proposed (hereinafter referred to as "first conventional technology"), which AR device presents images formed on a diffusion screen to a user by reflecting or transmitting the images while diffusing them. The diffusion screen achieves display and transmission of images by dispersing scatterers on a surface or inside of a transparent medium such as acrylic resin or organic material (see, for example, NPL 1).

Further, another type of AR device has also been proposed, which device displays stereoscopic or directional images to a user by combining multiple projection devices (hereafter sometimes referred to as the "second conventional technology"). This AR device is equipped with multiple projection devices that project a group of light rays reproducing stereoscopic or directional images; optical components such as a concave mirror and a Fresnel lens or holographic optical elements (HOE) having equivalent functions to the Fresnel lens; and optical components such as a half mirror, a lens array, a lenticular lens, and a diffuser plate that controls a direction and an area of observation.

CITATION LIST

Patent Literature

[PTL 1]
JP2002-258215-A

Non Patent Literature

[NPL 1]
Masatoshi Tokita, "Developing Transparent Film for Screens" [online], Japan Science and Technology Agency, Internet-retrieved on Aug. 4, 2020, <URL: https://vvww.jst.go.jpiseikaibt125-126.html>

SUMMARY OF INVENTION

Technical Problem

However, in the first conventional technology, light rays from a projection device enter a screen surface at different angles and are reflected or diffused, which limits a user's observation direction to a position on the screen surface that is a direction of normal reflection of the light from the projection device. Because light is most easily observed in the direction of the normal reflection (high efficiency of light utilization) and luminance decreases when a position deviates from the above normal reflection, an intensity distribution of observed light differs depending on a position on the screen surface, which often results in uneven luminance. Further, when a transmissive type of screen is used, light is most easily observed in a projection direction, and the uneven luminance often occurs for the same reason as in the above case in which the light rays are reflected or diffused.

Further, the second conventional technology increases the number of components, resulting in a larger device, because this technology makes it necessary to use one or more optical elements such as a half mirror, a lens array, a lenticular lens, and a diffusion plate in order to secure a practical observation direction and observation area in addition to the optical components such as the concave mirror, Fresnel lens, and HOE; and the multiple projection devices. Further, the second conventional technology has problems of blurred images and crosstalk occurring between the projection devices which results in lower image quality and lower efficiency of light utilization.

Accordingly, it is an object of the present invention to provide an AR optical element with high image quality, high efficiency of light utilization, and small size; and a manufacturing method thereof; as well as an AR display device.

Solution to Problem

In order to solve the aforementioned problems, an AR optical element according to the present embodiment is configured to reflect or transmit a group of light rays incident from a projection device and emits output light with a uniform intensity distribution over a predetermined angular width, wherein the AR optical element is configured to have periodic structures of refractive index multiplexed with a predetermined interval and multiplicity, the periodic structures each has an optical normal in a different direction from a physical normal orthogonal to a plane of a micro-region that reflects or transmits light.

According to the above configuration, the AR optical element is able to reflect or transmit a group of light rays incident from a projection device in a desired direction and with a desired angular interval and number of rays; and to focus output light with an uniform intensity distribution on a desired observation area, and therefore is able to suppress uneven luminance and improve image quality and efficiency of light utilization. Furthermore, because a single AR optical element controls a direction of a group of light rays and an observation area, an entire device is able to be downsized.

In addition, in the AR optical element according to the present embodiment, it is preferable that: the normal $\theta_{normal}$ of the periodic structure of the refractive index is expressed by an equation (1) that includes an incident vector $\theta_{IN}$ indicating a direction of the group of light rays and an output vector $\theta_{OUT}$ indicating a direction of a center of output light; an interval V of the periodic structure of refractive index is expressed by an equation (2) that includes a recording and reproducing wavelength λ of the AR optical element and an average refractive index no of the AR optical element; a multiplicity K of the periodic structure of refractive index in a horizontal directions is expressed by an equation (3) that includes a pre-configured angle width $\phi_X$ and an angular interval $\Delta\theta$ by which the angle width $\phi_X$ is divided (note that a floor(x) is a function that returns a maximum integer value less than or equal to x); a multiplicity L of the periodic structure of refractive index in a vertical direction is expressed by an equation (4) that includes a predetermined angular width $\phi_Y$ and an angular interval $\Delta\theta$ by which the angle width $\phi_Y$ is divided; and a multiplicity M of the periodic structure of refractive index in the horizontal and vertical directions is expressed by the following equation (5).

According to such a configuration, the AR optical element accurately reflects or transmits a group of light rays incident from a projection device to a desired observation area in a desired direction, angular interval, and number of rays, and therefore further improves image quality and light utilization efficiency.

Further, in order to solve the aforementioned problems, a method for manufacturing an AR optical element according to the present embodiment is a method for manufacturing an AR optical element that reflects or transmits a group of light rays incident from one or more projection devices using Equations (1) to (5), wherein the method includes steps of calculating a normal $\theta_{normal}$, an interval V, and multiplicities K, L, and M; computing a computer-generated hologram so that the periodic structures of refractive index having the normal $\theta_{normal}$ are multiplexed with the interval V and the multiplicity M; and producing the AR optical element using a hologram printer based on a result of computing the computer-generated hologram wherein an incident vector $\theta_{IN}$ indicates a direction of the group of light rays incident from the projection device; and an output vector $\theta_{OUT}$ indicates a direction to a center position of an observation area; angular intervals $\Delta\theta_X$ and $\Delta\theta_Y$ indicate spread angles respectively in the horizontal and vertical directions of the group of light rays incident from the projection device, and angular widths $\phi_X$ and $\phi_Y$ indicate angular widths respectively in the horizontal and vertical directions of the group of light rays reflected from or transmitted through the AR optical element.

The above method allows producing a high image quality, high efficiency of light utilization, and small-size of AR optical elements that is able to be used in an AR display device that displays stereoscopic and directional images.

In addition, in the method for manufacturing the AR optical element, the step of producing the AR optical element, when the periodic structure of refractive index is provided for each small region, it is preferable to vary an initial phase when computing the computer-generated hologram so that phases of the periodic structures of refractive index are continuous at a joint between the small regions.

Such a method allows manufacturing an AR optical element while recording hologram data for each small area on a hologram printer.

Furthermore, in order to solve the aforementioned problems, the present embodiment provides an AR display device configured to include one or more projection devices and the AR optical elements described above.

The AR display device according to such a configuration is able to reflect or transmit a group of light rays incident from the projection devices in a desired direction and an angular interval and to focus a group of light rays with an uniform intensity distribution onto a desired observation area, and therefore able to suppress uneven luminance, cross-talk between two or more projection devices, and blurred images and to improve image quality and light utilization efficiency. Furthermore, because the AR display device includes only the one or more projection devices and the AR optical elements, the entire device is able be downsized by utilizing fewer components.

Advantageous Effects of Embodiment

According to the present embodiment, it is possible to provide an AR optical element with high image quality, high efficiency of light utilization, and compact size, and a manufacturing method thereof, as well as an AR display device.

BRIEF DESCRIPTION OF DRAWINGS

FIG. 1A is an illustration explaining a periodic structure of refractive index according to the first embodiment, FIG. 1B is a graph showing a refractive index of a surface of an AR optical element according to the first embodiment.

FIG. 2A is an illustration explaining multiplexing of periodic structures of refractive indexes according to the first embodiment, FIG. 2B is a graph showing refractive indexes of a surface of an AR optical element according to the first embodiment.

FIGS. 3A and 3B are illustrations each explaining a normal of the periodic structure of the refractive index according to the first embodiment, FIG. 3C is an illustration explaining an angle width and an angle interval.

FIGS. 5A and 5B are illustrations each explaining a normal of a periodic structure of the refractive index according to the second embodiment.

FIG. 6A is a top view and FIG. 6B is a side view.

FIGS. 8A and 8B are illustrations each explaining an AR display device according to the fifth embodiment; FIG. 8A is a top view and FIG. 8B is a side view.

DESCRIPTION OF EMBODIMENTS

Figure 4:
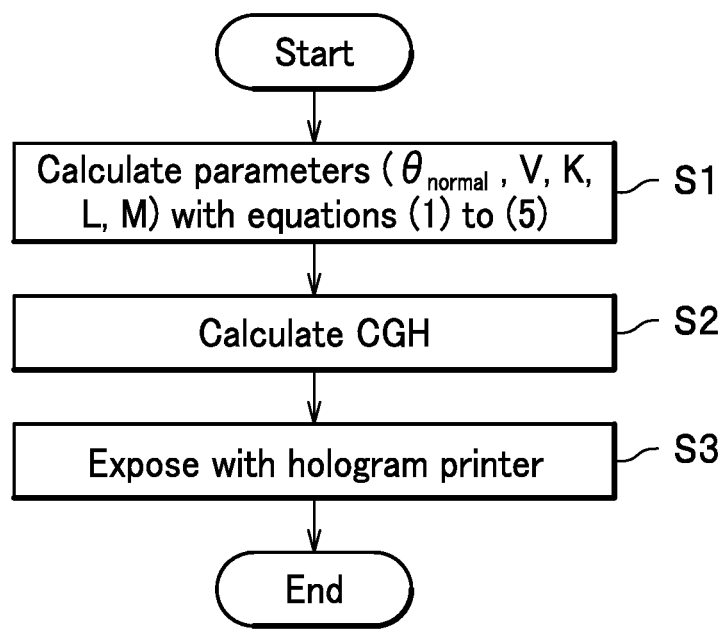
FIG. 4 is a flowchart showing a manufacturing method of an AR optical element according to the first embodiment.

Description is given below of each embodiment according to the present invention with reference to the drawings. Note that each embodiment described below is intended to embody the gist of technical concept of the invention and does not limit the invention to what are described below unless specifically stated. In each embodiment, the same components may be indicated with the same symbols and their descriptions may be omitted.

First Embodiment

[Configuration of AR Optical Element]

Referring to FIGS. 1 through 3, a configuration of an AR optical element 1 of the first embodiment is described. Hereafter, an X-axis is used for the horizontal directions, a Y-axis for the vertical directions, and a Z-axis for the depth directions. Only a Y-Z plane is shown for the sake of simplicity, but the same applies to the X-Z plane.

An AR optical element 1 reflects or transmits a group of light rays entering from projection devices 3 (FIG. 6) with a predetermined angular width, angular interval, and the number of rays to emit output lights with a uniform intensity distribution onto a desired observation area. In addition, the AR optical element 1 have periodic structures of refractive indexes multiplexed at a predetermined interval and a multiplicity, the periodic structures having optical normal in different directions from physical normal orthogonal to planes of micro-regions that reflect or transmit the group of light rays. In this embodiment, description is made assuming that the AR optical element 1 is of a reflective type that reflects incident light from the projection device 3.

<Periodic Structure of Refractive Index>

As shown in FIG. 1A, the AR optical element 1 includes a periodic structure 10 of refractive index having an optical normal B in a direction different from a physical normal A. Specifically, the AR optical element 1 includes the periodic structure 10 of refractive index having the normal B in the different direction from the normal A of the surface 11 of the micro-region that reflects the group of incident rays.

The periodic structure 10 of the refractive index is configured at an interval V so that the refractive index distribution varies periodically in directions along the Y-axis (the same applies to directions along the X-axis). As shown in FIG. 1B, the periodic structure 10 of the refractive index has a refractive index becoming higher and lower in a range of a maximum refractive index modulation amount Δn with respect to a referential average refractive index no at both ends of the interval V. FIG. 1B is an example of a higher refractive index, but the refractive index may be set as low as $(n_O - \Delta n)$. Further, note that the periodic structure 10 of the refractive index is inclined with respect to a normal A of a surface 11 of the micro-region. Further, the periodic structure 10 of the refractive index is configured to be continuous from a surface 11a of one micro-region to a surface 11b of the other micro-region. As described above, the AR optical element 1 differs from a dielectric multilayer film, which is fabricated by vapor deposition and has a periodic structure having a normal in the same directions as the physical normal.

<Multiplexing Periodic Structure of Refractive Index>.

As shown in FIG. 2A, the AR optical element 1 has the periodic structure 10 of refractive indexes shown in FIG. 1A multiplexed. In other words, the periodic structures 10 of refractive indexes with normal B having different directions are formed in a manner of overlapping on the same region along the Y-axis. In the AR optical element 1 of FIG. 2A, three periodic structures 10 of refractive indexes are multiplexed (multiplicity L=3). The first periodic structure of the refractive index 10₁ is illustrated with dashed lines, and a normal of the periodic structure of refractive index 10₁ is indicated by B₁. Further, the periodic structure of the second refractive index 10₂ is illustrated with solid lines, and a normal of the periodic structure of refractive index 10₂ is indicated by B₁. Furthermore, the periodic structure of the third refractive index 10₃ is illustrated with a long dashed line, and a normal of the periodic structure of refractive index 10₃ is indicated by B₃. As shown in FIG. 2B, the AR optical element 1 is configured to have three periodic structure of refractive index 10₁ to 10₃ multiplexed within a range of the maximum refractive index modulation amount Δn with respect to the referential average refractive index no. Thus, the AR optical element 1 is able to reflect light rays with an uniform intensity distribution over a predetermined angular width by multiplexing the periodic structures of refractive indexes 10.

Note that the multiplexing of the periodic structures of refractive indexes 10 means to form the periodic structures of the refractive index 10 having the normal B different in their directions at the same place.

<Method for Calculating Parameters>

Referring to FIGS. 1 through 3, a method for calculating the parameters necessary for multiplexing the periodic structures of refractive index 10 is described.

As shown in FIG. 3A, at each point 12 of the AR optical element 1, the normal $\theta_{normal}$ of the periodic structure of refractive index 10 is expressed by the following equation (1). Note that $\theta_{IN}$ is an incident vector indicating directions of a group of incident light rays, and $\theta_{OUT}$ is an emission vector of a central ray of a group of multiple emitted rays directing toward a central position U of an observation area. In addition, $\theta_{IN}$ and $\theta_{OUT}$ are actually angles at the AR optical element 1 having the average refractive index no that is converted from angles in the air.

[Math. 1]

$$\theta_{normal} = (\theta_{IN} + \theta_{OUT})/2 - 90° \quad (1)$$

As shown in FIG. 3B, the normal $\theta_{normal}$, the incident vector $\theta_{IN}$, and the output vector $\theta_{OUT}$ are all referenced to the Z-axis (normal A) and are positive counterclockwise with respect to the X-axis. In addition, the normal $\theta_{normal}$ of the periodic structure of the refractive index 10 varies according to the incident vector $\theta_{IN}$ and the output vector $\theta_{OUT}$ at each point 12, As shown in FIG. 1A, the interval V between the periodic structures 10 of the refractive indexes is expressed by the following equation (2). Note that the recording and reproducing wavelength λ of the AR optical element 1 represents a wavelength of light incident onto the AR optical element 1 during reproduction.

[Math. 2]

$$V = (\lambda/n_0)/|2 \sin(\theta_{IN} - \theta_{OUT})/2| \quad (2)$$

As shown in FIG. 3C, in order to reflect a group of incident light rays onto a range of an angle width $\phi_Y$ determined by a range $W_Y$ of a vertical observation area, the periodic structure of refractive index 10 are multiplexed by the angular interval $\Delta\theta_Y$. Here, the angular interval $\Delta\theta_Y$ equals a vertical spread angle of the group of incident light rays. Then, the group of outgoing light rays achieves almost uniform intensity distribution within an angular width $\phi_Y$ (the same in a horizontal angle width $\phi_X$). Here, the multiplicity K and L of the periodic structures of the refractive index 10 in the horizontal and vertical directions shall be expressed by the following equations (3) and (4). Therefore, the final multiplicity M, which is obtained by summing the periodic structures of the refractive index 10 in the horizontal and vertical directions, is expressed by the following equation (5) (where the floor(x) is a function that returns an integer maximum value less than or equal to x).

[Math. 3]

$$K = \text{floor}(\phi_X/\Delta\theta_X) + 1 \quad (3)$$

$$L = \text{floor}(\phi_Y/\Delta\theta_Y) + 1 \quad (4)$$

$$M = KL \quad (5)$$

Here, phases of the periodic structures of refractive indexes 10 should be matched at adjacent points 12.

In FIG. 3, only one point 12 located in a center of the AR optical element 1 is illustrated, but actually, parameters are calculated at all points 12 of the AR optical element 1.

[Method of Manufacturing AR Optical Elements]

As described above, the AR optical element 1 has a refractive index distribution achieved by a multiplexed periodic structure of refractive index 10. Therefore, in order to manufacture the AR optical element 1 using the conventional manufacturing method that makes object light and reference light interfere with each other, it is necessary to optically superimpose multiple object light rays incident at a precise angular interval Δθ and to control incident angles of each object light and a reference light depending on recording positions, but it is difficult to construct such an interference system to manufacture the AR optical elements 1. On the other hand, a hologram printing technology, which optically reproduces wavefront designed by a computer-generated hologram and exposes the wavefront as object light, makes it easy to manufacture the AR optical element 1.

It should be understood that the computer-generated hologram (CGH) is a technology that uses a computer to generate interference fringes (hologram data) between an object light and a reference light so as to obtain a desired reproduced image.

Next, detailed description is given of a manufacturing method of the AR optical element 1 referring to FIG. 4.

As shown in FIG. 4, the step S1 uses the equations (1) through (5) to calculate the normal $\theta_{normal}$, the interval V, and the multiplicities K, L, and M.

The step S2 performs computation of the computer-generated hologram so that the periodic structure of refractive index 10 having the normal $\theta_{normal}$ are multiplexed with the interval V and the multiplicity M. In other words, the step S2 uses the computer-generated hologram to generate the hologram data that reproduces object light capable of generating the AR optical element 1.

The step S3 produces the AR optical element 1 by hologram printing technology based on a result of the computation of the computer-generated hologram. In other words, the step S3 uses a hologram printer to make the wavefront as object light, which is reproduced by the hologram data generated in the step S2, interfere with a reference light and to expose the wavefront onto a general hologram recording material (for example, photosensitive photopolymer). Here, when generating the periodic structure of the refractive index for each small region, it is preferable to vary an initial phase for computing the computer-generated hologram so that phases of the periodic structure of refractive index are continuous at the connection of the small regions.

Thus, it is possible to produce the AR optical element 1 that has so high image quality, high efficiency of light utilization, and small size that is able to be used in a 3D AR display device.

In addition, when producing the AR optical element 1 that works for multiple reproduction wavelengths λ, it is sufficient to perform the above steps S1 to S3 for each of the reproduction wavelengths λ and to multiplex the periodic structure of refractive index corresponding to respective reproduction wavelengths on a single hologram recording material.

Effects of First Embodiment

As described above, the AR optical element 1 according to the first embodiment is able to reflect the group of light rays incident from the projection device 3 in a desired directions with appropriate angular widths, angular intervals, and number of rays, and to focus a group of light rays with a uniform intensity distribution on a desired observation area, and thereby suppressing uneven luminance and improving image quality and efficiency of light utilization.

Furthermore, the AR optical element 1, compared to the first and second conventional technologies, is able to reflect only incident light having desired wavelength and transmit remaining incident light having other wavelengths according to the Bragg condition, and therefore, is able to achieve both high-luminance image display and high transmittance of background light.

Second Embodiment

[Configuration of AR Optical Element]

Referring to FIG. 5, a configuration of an AR optical element 1B according to the second embodiment is explained in terms of differences from the first embodiment.

In the first embodiment described above, explanation is done assuming that the AR optical element 1 is a reflective type. On the other hand, this second embodiment differs from the first embodiment in that the AR optical element 1B is a transmission type that transmits incident light from the projection device.

The AR optical element 1B has periodic structures of refractive indexes multiplexed at a predetermined interval and a multiplicity, the periodic structure having optical normal in different direction from a physical normal of a plane of a micro-region that transmits a group of light rays. The AR optical element 1B has a multiplexed periodic structure of refractive index having optical normal in different directions with respect to the physical normal of the surface of the micro-region through which the group of incident rays is transmitted, at a predetermined interval and multiplexing number (FIG. 1). In other words, the AR optical element 1B has a multiplexed periodic structures of refractive indexes as in the first embodiment, and the method of calculating parameters is the same as the first embodiment.

<Method for Calculating Parameter>

Referring to FIG. 5, the method for calculating the parameters necessary for multiplexing the periodic structure of the refractive index is described.

As shown in FIG. 5A, at each point 12B of the AR optical element 1B, the normal of the periodic structure of the refractive index $\theta_{normal}$ is expressed by the aforementioned equation (1), as in the first embodiment.

As shown in FIG. 5B, the normal $\theta_{normal}$, the incident vector $\theta_{IN}$, and the output vector $\theta_{OUT}$ are all referenced to the Z-axis (normal A) and are positive counterclockwise to the X-axis. In addition, the normal of the periodic structure of the refractive index, $\theta_{normal}$ varies depending on the incident vector $\theta_{IN}$ and the output vector $\theta_{OUT}$ at each point 12B.

The interval V of the periodic structures of refractive indexes is expressed by the aforementioned equation (2) as in the first embodiment. The multiplicities K, L, and M of the periodic structure of refractive index are expressed respectively by the above equations (3) to (5), as in the first embodiment.

Incidentally, the phases of the periodic structure of refractive index should preferably match each other between adjacent points 12B.

Further, FIG. 5 illustrates only one point 12B located in a center of the AR optical element 1B, but actually, the parameters are calculated at all points 12B of the AR optical element 1B.

[Effect]

As described above, the AR optical element 1B according to the second embodiment is able to transmit a group of light rays incident from the projection device 3 in desired directions with appropriate angular width, angular interval, and number of rays, and to focus the group of light rays with uniform intensity distribution on a desired observation area, and thus to improve image quality and light utilization efficiency.

Third Embodiment

[Configuration of AR Display Device]

Description is given of a configuration of the AR display device 2 according to the third embodiment, with reference to FIG. 6.

Figure 6A:
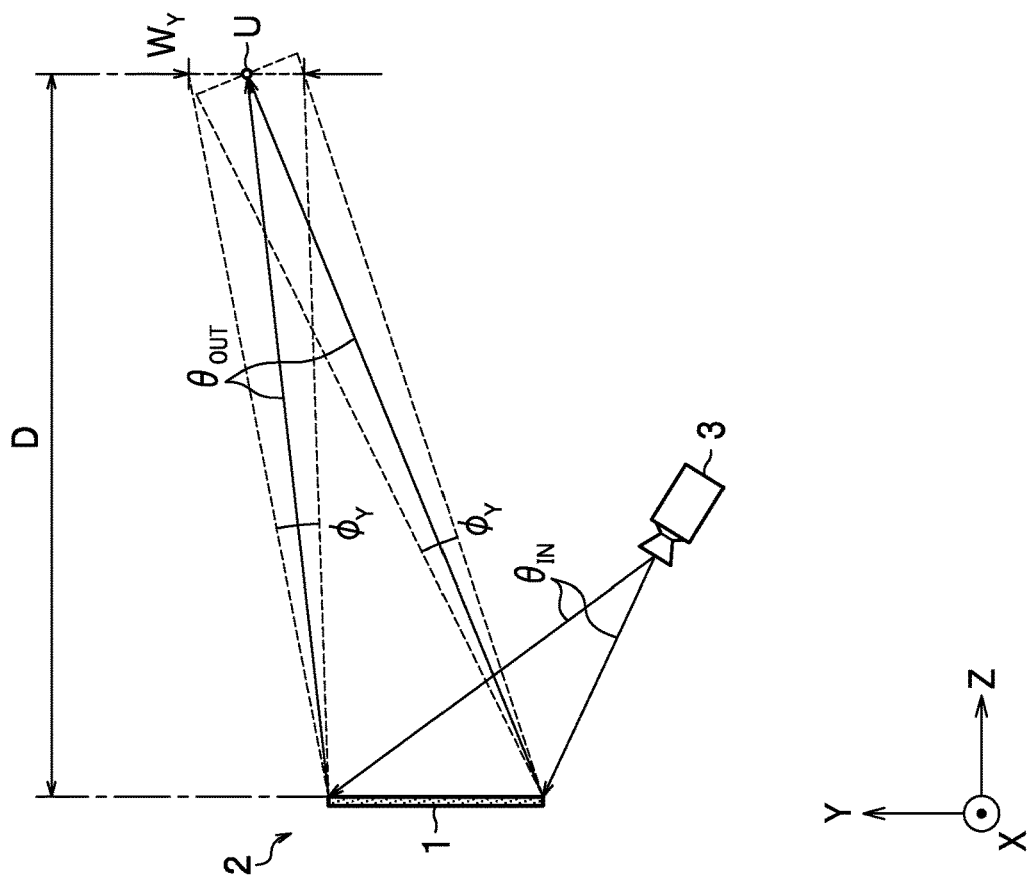
FIGS. 6A and 6B are illustrations each explaining an AR display device according to the third embodiment.
Figure 6B:
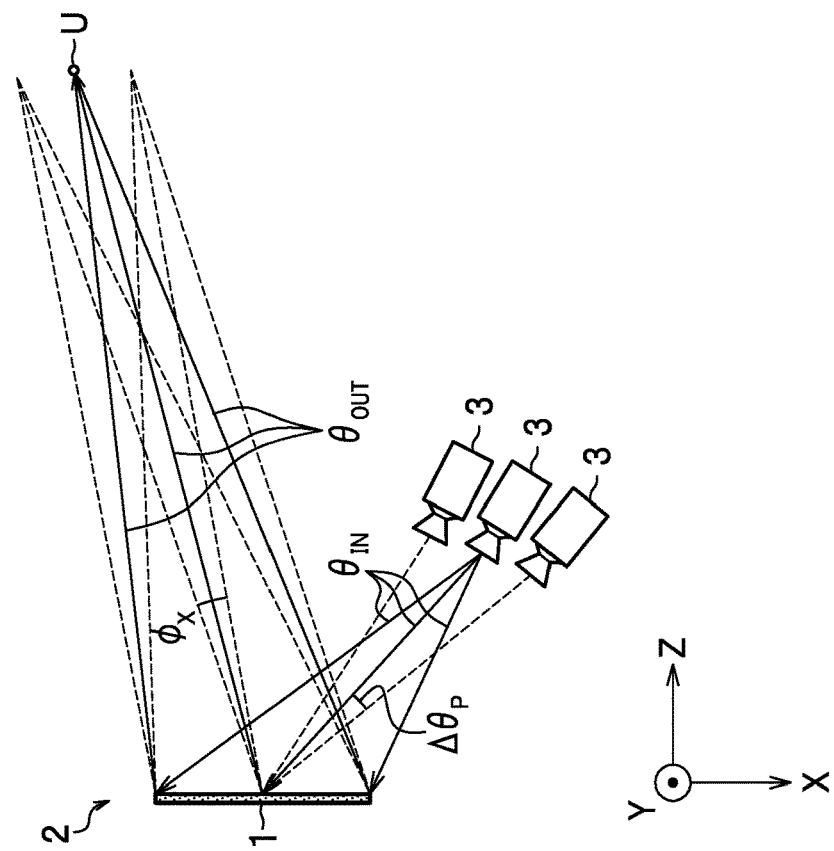

An AR display device 2 uses the light field technique to perform an AR display of a stereoscopic image (image that is viewed three-dimensionally as if it has a three-dimensional shape) or an image with directionality (image whose given information changes depending on an observation direction). As shown in FIGS. 6A and 6B, the AR display device 2 is equipped with a reflective type of AR optical element 1 (see FIG. 3) and N projection devices 3 (note that N is larger or equal to 2). Because the AR optical element 1 is the same as in the first embodiment, its description is omitted (see FIGS. 1 to 3).

The projection device 3 is a well-known projector that projects elemental images to make the AR optical element 1 display stereoscopic or directional images as a group of light rays. In the present embodiment, as shown in FIG. 6A, for example, three projection devices 3 are horizontally arranged in an arc or straight shape (N=3) with an angular interval $\Delta\theta_P$ and horizontal and vertical spread angles of the group of light rays incident from each projection device 3 are $\Delta\theta_X$ and $\Delta\theta_Y$.

Note that FIG. 6 shows only the incident vector $\theta_{IN}$ and the output vector $\theta_{OUT}$ at a center and both ends of the AR optical element 1, but actually, there exist the incident vector $\theta_{IN}$ and the output vector $\theta_{OUT}$ at every points of the AR optical element 1.

In such a case, in the horizontal directions, it is enough for the angle width $\phi_X$ in the equation (3) to be $\Delta\theta_P$ to produce the AR optical element 1. In FIG. 6A, the incident vector $\theta_{IN}$ indicates a direction (incidence angle) of the group of light rays incident from the projection device 3 located at a center. When the number of projection devices 3 is even, it is sufficient either to assume a hypothetical projection device 3 at the center or to define $\theta_{IN}$ as the direction of the group of light rays incident from any one of two projection devices 3 located at the center. In addition, the outgoing vector Sour indicates a direction toward a center position U of the observation area. In the vertical directions, as shown in FIG. 6B, the projection device 3 located at a center is defined as a reference similarly to the horizontal directions, and a calculation of the angle width $\phi_Y$ etc. is the same as in the first embodiment, and therefore explanation thereof is omitted. In such a case, the horizontal and vertical center positions U of the observation area may be set independently of each other. As described above, the AR display device 2 allows displaying on the AR display element 1 used as a screen stereoscopic or directional images with the light field technique that reproduces a large number of light rays without gaps in the horizontal directions.

[Effect]

As described above, the AR display device 2 according to the third embodiment, like the first embodiment, achieves both high luminance video display and high transmittance of background light. In addition, because the AR optical element 1 reflects a group of incident light rays in a desired reflection direction at an appropriate angular interval, angular width, and number of rays, the AR display device 2 prevents crosstalk among multiple projection devices 3 as the crosstalk in the second conventional technology, and thereby allows improvement in image quality and efficiency of light utilization. Furthermore, the AR display device 2 allows AR display of stereoscopic images and directional images with the light field technique using a single AR optical element 1.

Fourth Embodiment

[Configuration of AR Display Device]

Figure 7:
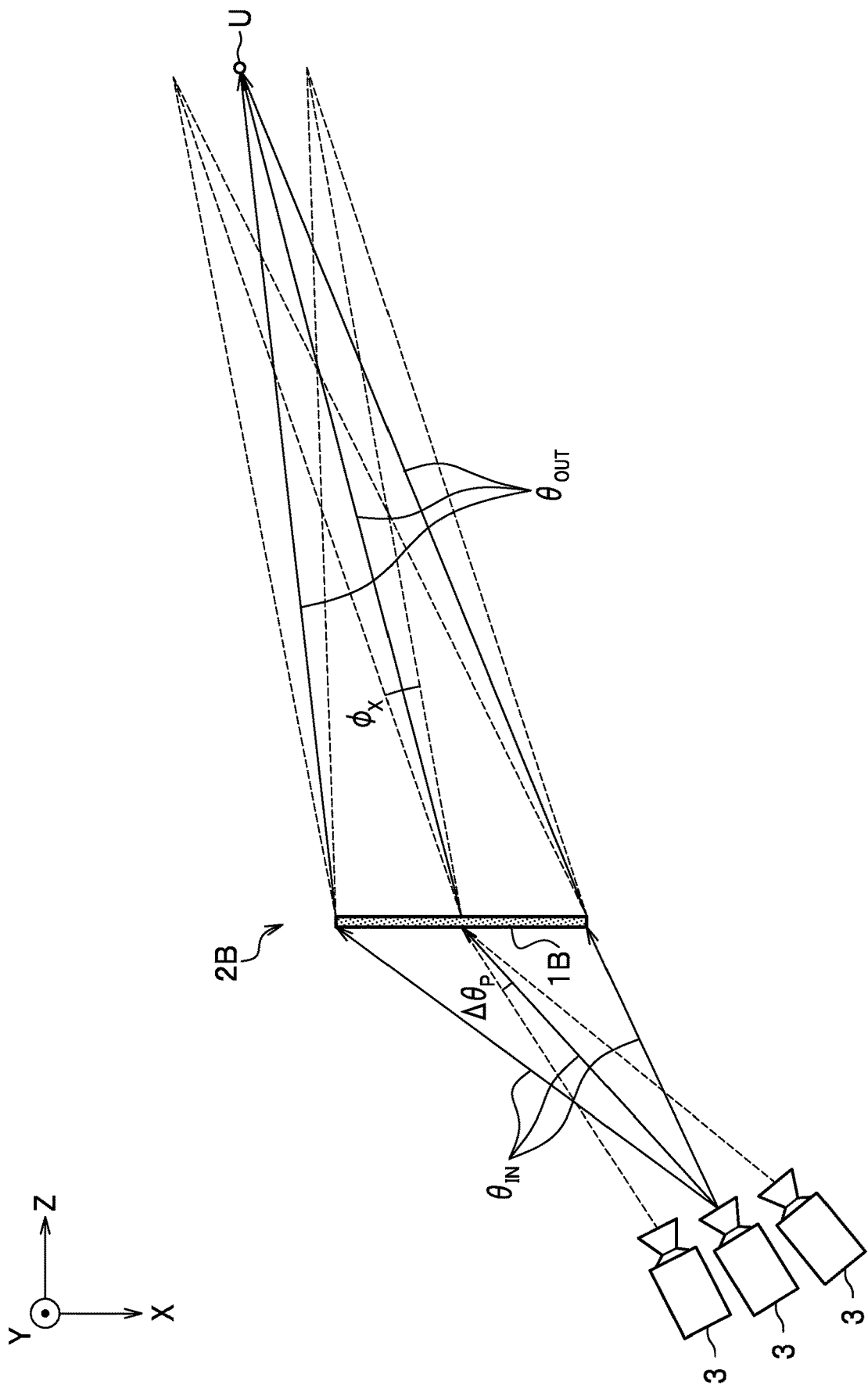
FIG. 7 is an illustration explaining an AR display device according to the fourth embodiment.

Referring to FIG. 7, a configuration of the AR display device 2B according to the fourth embodiment is explained in terms of the differences from the third embodiment.

The third embodiment is explained that the AR display device 2 is equipped with the reflective type of AR optical element 1. In contrast, the fourth embodiment differs from the third embodiment in that the AR display device 2B is equipped with a transmission type of AR optical element 1B.

As shown in FIG. 7, the AR display device 2B is equipped with a transmission type of AR optical element 1B (FIGS. 5A and 5B) and N projection devices 3. In the present embodiment, as shown in FIG. 7, three of the projection devices 3 (N=3) are arranged horizontally in arc shapes or straight lines with an angular interval $\Delta\theta_P$, and horizontal and vertical spread angles of the light rays incident from each projection device 3 are respectively $\Delta\theta_X$ and $\Delta\theta_Y$.

Note that FIG. 7 shows only the incidence vector ON and the output vector $\theta_{OUT}$ located at both ends of the AR optical element 1B, but actually, the incident vector $\theta_{IN}$ and the output vector $\theta_{OUT}$ exists at all points of the AR optical element 1B.

In the present case, in the horizontal directions, the AR optical element 1B can be manufactured with setting of the angle width $\phi_X$ in the equation (3) as $\Delta\theta_P$. In FIG. 7, the incident vector $\theta_{IN}$ indicates a direction (incidence angle) of a group of light rays incident from the projection device 3 located at a center. When the number of projection devices 3 is even, it is sufficient either to assume a hypothetical projection device 3 at the center or to define $\theta_{IN}$ as the direction of the group of light rays incident from any one of two projection devices 3 located at the center. In addition, the outgoing vector $\theta_{OUT}$ indicates a direction toward a center position U of the observation area. In the vertical directions, the projection device 3 located at a center is defined as a reference similarly to the horizontal directions, and therefore explanation is omitted. In such a case, the horizontal and vertical center positions U of the observation area may be set independently of each other. As described above, the AR display device 2B allows displaying on the AR display element 1B used as a screen stereoscopic or directional images with the light field technique that reproduces a large number of light rays without gaps in the horizontal directions.

[Effect]

As described above, the AR display device 2B of the fourth embodiment, like the first embodiment, achieves both a high luminance video display and a high transmittance of background light. In addition, because the AR optical element 1B transmits the group of incident light rays in a desired transmission direction at an appropriate angular interval, angular width, and number of rays, which prevents crosstalk from occurring between multiple projection devices 3 as the crosstalk in the second conventional technology, resulting improvement of image quality and efficiency of light utilization. Furthermore, the AR display device 2B allows AR display of stereoscopic images and directional images with the light field technique using a single AR optical element 1B.

Fifth Embodiment

[Configuration of AR Display Device]

Referring to FIG. 8, description is given of a configuration of the AR display device 2C according to the fifth embodiment.

As shown in FIGS. 8A and 8B, the AR display device 2C performs two-dimensional AR display and includes a reflective type of AR optical element (FIG. 3) and one projection device 3.

Here, the AR display device 2C forms an image from the projection device 3 onto the AR optical element 1. At each point 12, the incident vector $\theta_{IN}$ indicates a direction (incidence angle) of a group of light rays incident from the projection device 3. Also, the output vector $\theta_{OUT}$ indicates a direction to a center position U of the observation area, which center is a center of the user's observation location.

Note that FIG. 8 shows the incidence vector $\theta_{IN}$ and the output vector $\theta_{OUT}$ at two points located at both ends of the AR optical element 1, but that actually, the incident vector $\theta_{IN}$ and the output vector $\theta_{OUT}$ exist at every points of the AR optical element 1.

[Effect]

As described above, the AR display device 2C according to the fifth embodiment uses the AR optical element 1 and therefore improves the efficiency of light utilization. Furthermore, the AR display device 2C, compared to the first conventional technology, allows improving uneven luminance within a range of a width $W_X$ and $W_Y$ of the observation area, the higher efficiency of light utilization, and compatibility of high luminance video display and high transmittance of background light.

Sixth Embodiment

[Configuration of AR Display Device]

Figure 9:
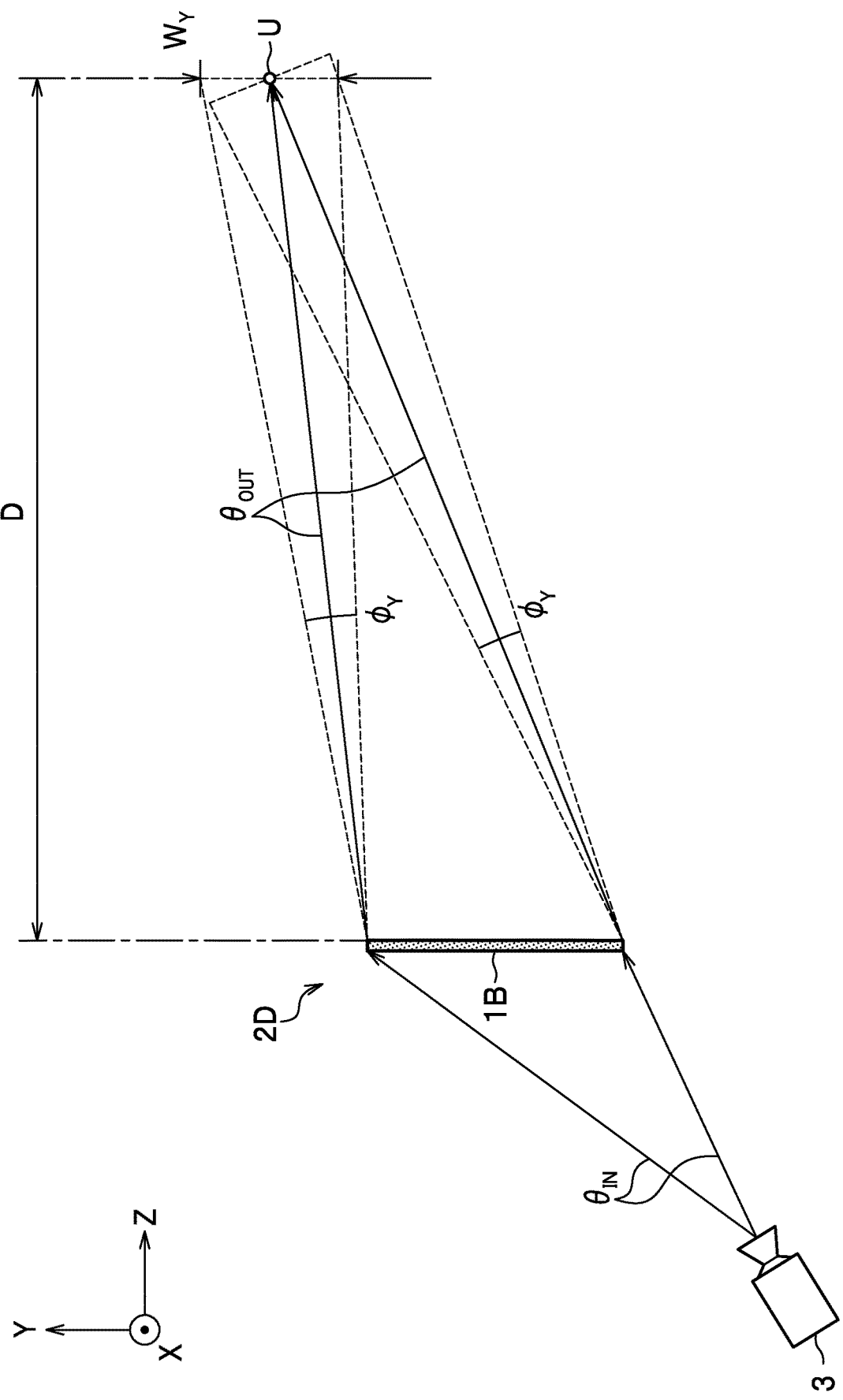
FIG. 9 is an illustration explaining an AR display device according to the sixth embodiment.

Referring to FIG. 9, description is given of a configuration of an AR display device 2D according to the sixth embodiment in terms of differences from the fifth embodiment.

In the fifth embodiment, the AR display device 2C is described to be equipped with the reflective type of AR optical element 1. On the other hand, the sixth embodiment differs from the fifth embodiment in that the AR display device 2D is equipped with a transmission type of AR optical element 1B.

As shown in FIG. 9, the AR display device 2D performs a two-dimensional AR display and is equipped with the transmission type of AR optical element 1B (FIG. 5) and one projection device 3. Here, the AR display device 2D forms an image from one projection device 3 onto the AR optical element 1B.

Note that FIG. 9 shows the incidence vector $\theta_{IN}$ and the output vector $\theta_{OUT}$ at two points located at both ends of the AR optical element 1B, but that the incident vector $\theta_{IN}$ and the output vector $\theta_{OUT}$ actually exist at every points of the AR optical element 1B.

[Effect]

As described above, the AR display device 2D according to the sixth embodiment employs the AR optical element 1B, which improves the efficiency of light utilization. Furthermore, the AR display device 2D, compared to the first conventional technology, improves the uneven luminance within a range of width $W_X$ and $W_Y$ of an observation area, and allows higher efficiency of light utilization and compatibility of high luminance video display and high transmittance of the background light.

The embodiments of the invention are described above in detail, but the present invention is not limited thereto and includes design modifications and the like within a scope that do not depart from the gist of the present invention.

For example, the AR optical element is not limited to that having a flat shape.

INDUSTRIAL APPLICABILITY

The AR optical elements of the present embodiment can be used, for example, for smart glasses and an in-vehicle head-up display, which are in high demand for AR applications. Further, the AR optical elements can also be applied for a digital signage that displays stereoscopic images, multilingual displays and directional displays that require different image displays and different information presentations for respective direction. Furthermore, the AR optical elements of the present embodiment can be used for security displays incorporated in ATMs and other devices that need to display specific images only to specific users.

REFERENCE SIGNS LIST 1, 1B: AR optical elements
2, 2B-2D: AR display device
3: Projection device
10, $10_1$-$10_3$: Periodic structure of refractive index
11, 11a, 11b: Surface
12, 12B: Point

The invention claimed is:

1. A method for manufacturing an AR optical element wherein
the AR optical element is configured to reflect or transmit a group of light rays incident from one or more projection devices and emit output light with a uniform intensity distribution over a predetermined angular width, and
to have periodic structures of refractive index multiplexed with a predetermined interval and multiplicity, the periodic structures of the refractive index each has an optical normal in a different direction from a physical normal orthogonal to a plane of a micro-region that reflects or transmits the group of light rays, and
wherein
when an incident vector $\theta_{IN}$ denotes a direction of the group of light rays incident from the projection device; an output vector $\theta_{OUT}$ denotes a direction to a center position of an observation area; the predetermined angular width is denoted by $\Phi_X$ and $\Phi_Y$ that are angular widths respectively in horizontal and vertical directions of the group of light rays reflected from or transmitted through the AR optical element; and angular intervals $\Delta\theta_X$ and $\Delta\theta_Y$, into which the angular widths $\phi_X$ and $\phi_Y$ are respectively divided, denote spread angles respectively in the horizontal and vertical directions of the group of light rays incident from the projection device, a normal $\theta_{normal}$ of the periodic structure of the refractive index is expressed by an equation (1) below

[Math. 1]

$$\theta_{normal} = (\theta_{IN} + \theta_{OUT})/2 - 90° \quad (1)$$

an interval V of the periodic structure of the refractive index is expressed by an equation (2) below that includes a recording and reproducing wavelength λ of the AR optical element and an average refractive index no of the AR optical element

[Math. 2]

$$V=(\lambda/n_O)|2\sin(\theta_{IN}-\theta_{OUT})/2| \quad (2);$$

a multiplicity K of the periodic structure of the refractive index) in horizontal directions is expressed by an equation (3) below, wherein a floor(x) is a function that returns a maximum integer value less than or equal to x

[Math. 3]

$$K=\text{floor}(\phi_X/\Delta\theta_X)+1 \quad (3)$$

a multiplicity L of the periodic structure of the refractive index in vertical directions is expressed by an equation (4) below

[Math. 4]

$$L=\text{floor}(\phi_Y/\Delta\theta_Y)+1 \quad (4); \text{ and}$$

a multiplicity M of the periodic structure of the refractive index in the horizontal and vertical directions is expressed by the following equation (5)

[Math. 5]

$$M=KL \quad (5) \text{ and}$$

wherein
the method includes steps of:
calculating a normal $\theta_{normal}$, an interval V, and multiplicities K, L, and M;
computing a computer-generated hologram so that the periodic structures of the refractive index having the normal $\theta_{normal}$ are multiplexed with the interval V and the multiplicity M; and
producing the AR optical element using a hologram printer based on a result of the computing of the computer-generated hologram.

2. The method for manufacturing the AR optical element according to claim 1,
wherein
in order for forming the periodic structures of the refractive index for each of small regions of the AR optical element, the producing the AR optical element varies an initial phase for computing the computer-generated hologram so that phases of the periodic structures of the refractive index are continuous at joints between the small regions.

3. An AR display device comprising one or more projection devices and the AR optical element according to claim 1.

* * * * *